W. R. G. HUMPHREY
Improvement in Cut-Offs for Harvesters.
No. 123,023.  Patented Jan. 23, 1872.
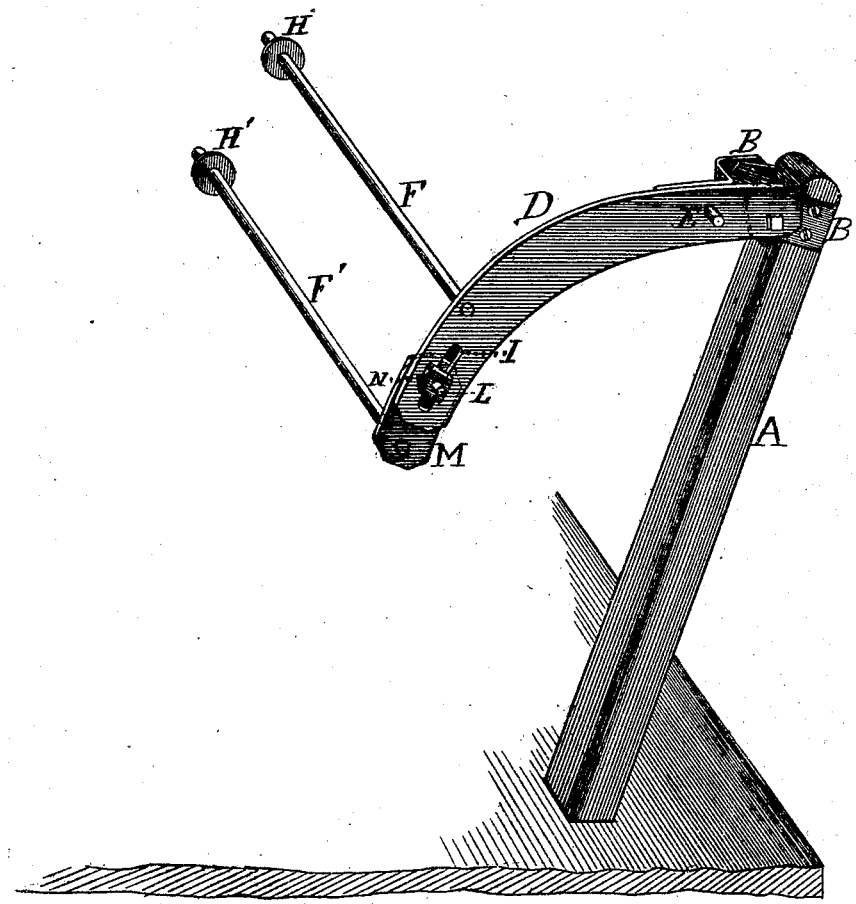

123,023

UNITED STATES PATENT OFFICE.

WILLIAM R. G. HUMPHREY, OF CHILLICOTHE, MISSOURI, ASSIGNOR TO ARTEMAS N. SMITH.

IMPROVEMENT IN CUT-OFFS FOR HARVESTERS.

Specification forming part of Letters Patent No. 123,023, dated January 23, 1872.

*To all whom it may concern:*

Be it known that I, WILLIAM R. G. HUMPHREY, of the city of Chillicothe, in the county of Livingston, in the State of Missouri, have made certain new and useful Improvements in Cut-Offs for Harvesters, of which the following is a specification:

*Nature and Objects of the Invention.*

The invention relates to cut-offs for harvesters. The object of the invention is to provide one or more drop-rods, which are provided at one end with buttons and at the other attached to the drop-bar of a harvester by being secured to a plate made adjustable by means of a slot on the end of the drop-bar and a set-screw fastening the plate to the bar.

*Description of the Accompanying Drawing.*

Figure 1 in the accompanying drawing is a perspective view of the device affixed to the reel-standard, which is set in the platform of a harvester.

*General Description.*

A in the accompanying drawing represents the reel-standard, which is properly secured on the platform of a harvester. To the upper part of the reel-standard two flanges, B, are bolted, on which is pivoted the curved drop-bar D, of usual construction, and provided with a pin, E, which serves as a means of connecting the drop-bar with the operative parts of the harvester. The drop-bar is provided with the drop-rod F, which is secured rigidly at one end to the drop-bar, its other end being provided with the button H. The lower extremity of the drop-bar is furnished with the slot I, through which passes the threaded pin L secured to the plate M, and provided with the nut N, so that the plate is readily adjusted by loosening the nut N, moving the plate to the point desired, and then tightening the nut. To the lower part of the plate M is rigidly secured the drop-rod F′, the other end of which is provided with the button H′.

*Operation.*

When the device is properly attached to the reel-standard it operates above the platform. The harvester being in motion, the device is elevated until a sufficient quantity of grain is cut and lying upon the platform to form a sheaf. The cut-off is then depressed, thus holding back the cut grain from falling upon the platform while the rake is operating to remove the gavel, as soon as which operation is performed the cut-off is elevated, the grain sustained by it falling upon the platform.

The object of the buttons is to prevent the grain being blown or otherwise passed over the ends of the drop-rods and to lay the tangled grain in a straight gavel upon the platform.

*Claim.*

What I claim as my invention, and desire to secure by Letters Patent, is—

The cut-off consisting of the curved drop-bar D, adjustable plate M, and drop-rods F F′ provided with the buttons H H′, constructed substantially as shown and described.

In testimony that I claim the foregoing improvements in cut-offs for harvesters, as above described, I have hereunto set my hand and seal this 20th day of December, 1871.

WILLIAM R. G. HUMPHREY. [L. S.]

Witnesses:
R. W. GOLDSBY,
ZACH. NANCE.